US011931921B2

(12) United States Patent
Gnam et al.

(10) Patent No.: US 11,931,921 B2
(45) Date of Patent: Mar. 19, 2024

(54) EXTRUDER, FACILITY COMPRISING AN EXTRUDER, AND METHOD FOR PRODUCING TARGET POLYMER PRODUCTS CONSISTING OF A PLASTIC-CONTAINING MATERIAL FROM A SOLUTION USING SUCH AN EXTRUDER

(71) Applicant: DOMO ENGINEERING PLASTICS GMBH, Premnitz (DE)

(72) Inventors: Hans-Jürgen Gnam, Memmingen (DE); Renè Gloor, Memmingen (DE); Tamer Balikavlayan, Memmingen (DE)

(73) Assignee: DOMO ENGINEERING PLASTICS GMBH, Premnitz (DE)

( * ) Notice: Subject to any disclaimer, the term of this patent is extended or adjusted under 35 U.S.C. 154(b) by 884 days.

(21) Appl. No.: 16/968,868

(22) PCT Filed: Feb. 7, 2019

(86) PCT No.: PCT/EP2019/052960
§ 371 (c)(1),
(2) Date: Aug. 10, 2020

(87) PCT Pub. No.: WO2019/154889
PCT Pub. Date: Aug. 15, 2019

(65) Prior Publication Data
US 2021/0008763 A1    Jan. 14, 2021

(30) Foreign Application Priority Data

Feb. 8, 2018   (DE) .................... 10 2018 102 811.3

(51) Int. Cl.
*B29B 17/02*    (2006.01)
*B29B 7/90*     (2006.01)
(Continued)

(52) U.S. Cl.
CPC ............ *B29B 17/0206* (2013.01); *B29B 7/90* (2013.01); *B29B 9/02* (2013.01); *C08F 6/10* (2013.01); *C08J 3/22* (2013.01); *B29B 2017/0293* (2013.01); *B29K 2023/06* (2013.01); *B29K 2077/00* (2013.01); *B29K 2507/04* (2013.01); *C08J 2323/06* (2013.01)

(58) Field of Classification Search
CPC ......... B29B 17/0206; B29B 7/90; B29B 9/02; B29B 2017/0293; C08F 6/10; C08J 3/22; C08J 3233/06; B29K 2023/06; B29K 2077/00; B29K 2507/04
USPC ....................................................... 526/352
See application file for complete search history.

(56) References Cited

U.S. PATENT DOCUMENTS 11,584,830 B2 * 2/2023 Sameshima ........... B29C 48/385
2008/0262196 A1 * 10/2008 Giammattei ............ B29B 7/487
                                                        528/480

FOREIGN PATENT DOCUMENTS

JP        09277351 A * 10/1997  ............. B29C 47/92
WO    WO-2009136904 A2 * 11/2009  ............. B29B 7/483

* cited by examiner

*Primary Examiner* — Michael M. Bernshteyn
(74) *Attorney, Agent, or Firm* — MARSHALL, GERSTEIN & BORUN LLP

(57) ABSTRACT

An extruder including a housing, a first material inlet for a mixture at least consisting of a solvent and a dissolved medium, a material outlet, a screw, a screw drive, and at least one distillation region between the inlet and the outlet, which allows an outflow of solvent, and a discharge line for the solvent.

28 Claims, 4 Drawing Sheets

(51) Int. Cl.
  *B29B 9/02* (2006.01)
  *B29K 77/00* (2006.01)
  *B29K 507/04* (2006.01)
  *C08F 6/10* (2006.01)
  *C08J 3/22* (2006.01)

EXTRUDER, FACILITY COMPRISING AN EXTRUDER, AND METHOD FOR PRODUCING TARGET POLYMER PRODUCTS CONSISTING OF A PLASTIC-CONTAINING MATERIAL FROM A SOLUTION USING SUCH AN EXTRUDER

The present invention relates to an extruder and to a facility comprising such an extruder, and to a method for producing target polymer products consisting of a plastic-containing material, such as a pure target polymer or a composite material containing the target polymer, from a solution using such an extruder, and to the target polymer products obtainable by this method or with the facility. The invention relates in particular to the production of these target polymer products from production waste of composite materials.

Large-scale methods must enable the cost-effective production of products. The main cost factors here are energy costs, raw material costs, the time required to produce a product and the costs for facility construction. Especially in conjunction with raw material costs, mechanical recycling processes are becoming increasingly important. Recycling processes in which used materials or individual components thereof are mechanically reused have the great advantage that the starting materials serving as raw materials are available free of charge or at low cost. Like other methods, however, recycling methods must also be energy-efficient and have a high added value and must also meet other requirements, such as the simple, rapid processing of large volume flows in equipment that is as uncomplicated as possible.

Because of their many advantages, more and more products are being made from polymers or composite materials containing polymers. However, there are also disadvantages associated with products made of polymers. The primary production of these materials is energy-intensive. It requires large quantities of petroleum products. Especially, the disposal of the old materials made of polymers is becoming an increasing problem. For example, the disposal of polymers in landfills is no longer permitted by law. The incineration or oiling of polymer waste leads to a downcycling from a material point of view. In addition, polymers in waste are increasingly perceived as a valuable source of raw materials for reuse in new products. There is therefore a need for mechanical recycling techniques, especially for plastic-containing composite materials that cannot be separated using conventional methods.

Various technical problems arise in the manufacture of polymer products from materials containing plastics. The first is that recycling processes, like primary production, can be energy and material intensive. A second problem is that polymers, as duromers, elastomers and thermoplastics, differ in their macromolecular structure, and their chemical composition is usually so different that processing must be designed to be polymer-specific. A third problem is that polymers are being used more and more extensively in composite materials, in which they are firmly bonded to other polymers as well as metals or other solids. In addition, the plastic materials may be provided with additives such as dyes, reinforcing fillers or pigments. When recycling such composite materials, the accompanying substances of the target polymers must be completely separated, which can be technically difficult. A further problem is that the target polymers in composite materials, which are often multilayer materials, are laminated by other materials and are therefore difficult to recycle.

A first aspect of the present invention relates to the production of target polymer products from recycled target polymers, in particular thermoplastics, which are present as pure polymers or are contained as a component in a composite material while solving the above problems. A second aspect of the present invention concerns the introduction of large amounts of additives into the isolated target polymer products as part of the method for obtaining additive-containing target polymer products.

Unlike elastomers and duromers, thermoplastics can be dissolved in organic solvents due to their straight-chain structure. A well-known method for recycling thermoplastics therefore consists of dissolving a thermoplastic in an organic solvent and recovering it in powder form from the solution. Achieving and maintaining the preferred powdery state proves difficult when working at elevated temperatures. When heated, a powdery thermoplastic at the glass transition temperature first changes to the rubber-elastic state, in which the particles stick together. On further heating, the particles melt, usually producing a viscous mass. If the viscous mass is then cooled down again, rubber-like or glassy or even sticky agglomerates often form due to the macromolecular structure of the polymers. A return to the powdery state, which is advantageous for the packaging, storage, transport and further processing of thermoplastics, is usually not easily possible. In the method here, it must therefore be ensured that the target polymer is obtained as a granular or powdery target polymer product and that further processing up to the marketable target polymer product from the target polymer is designed in such a way that the target polymer particles do not fuse into glassy masses.

According to the invention, a target polymer product is any product obtained by carrying out one of the processes according to the invention. Accordingly, the term "target polymer product" includes the target polymer products which are target polymers which may have a residual content of water and/or solvent, and also the target polymer products which can be produced therefrom by complete drying anhydrously and/or solvent-free, as well as the target polymer products into which additives such as carbon black or reinforcing fillers have been deliberately introduced. Irrespective of this definition, in the present description target polymer products are in part, but also in a shortened form, simply referred to as target polymers.

A recycling method in which target polymers are produced in powder form consists of selectively dissolving a water-insoluble target polymer in an organic solvent and precipitating it from the polymer solution with the aid of water. For the precipitation, the polymer solution can be introduced into liquid water. Alternatively, the polymer solution can be presented and then the liquid water can be added. In this method, especially at room temperature, a powdery target polymer is often formed in a large amount of a water-solvent mixture.

EP 1 124 908 B1 describes a method for producing dye-containing polymer particles containing at least one dye in a matrix of a substantially water-insoluble polymer. The polymer particles are precipitated from a solution of the polymer and the dye in a water-miscible organic solvent by adding an aqueous phase.

EP 0 644 230 B1 concerns a method for the processing or conversion of polyolefin granules, films or sheets and composite materials containing polyolefins for the almost complete recycling of the individual components. A polymer component is dissolved in a solvent. Olefinic polymers, for example, are dissolved in cycloalkanes and precipitated with an aqueous surfactant solution.

EP 1 646 678 B1 discloses a method for recovering at least one polymer dissolved in a solvent by precipitation with water. After dissolving the polymer, an additive can be added to the solution.

In US 2008/47671 A1 a method for the recovery of a polymer dissolved in a solvent is described. Water is added to the homogeneous medium. The solvent is removed from the formed heterogeneous medium by heating and evaporation. The homogeneous medium may contain additives.

However, the above methods have not been used on a large scale to date, although there is a comprehensive prior art available for this purpose, especially since the removal of the solvent is very complex in relation to the state in which the target polymer is obtained.

DE 10 2014 114831 A1 and DE 10 2016 106726 A1 describe a method for producing target polymer products from plastic-containing materials. A solution comprising the target polymer product is successively dried in a falling-film evaporator, a thin-film evaporator and in a vacuum screw with the addition of steam and brought to the desired residual moisture content of the solvent.

Further documents are DE 2612827 A1, US 2006/0089487 A1, EP 2550148 B1, WO 2010/089137 A2, DE 4113336 C1, DE 60012778 T2, DE 60113973 T2, DE 69033888 T2, DE 69918586 T2, DE 60 2005 003814 T2, U.S. Pat. No. 6,239,225 B1, U.S. Pat. No. 6,348,636 B1, U.S. Pat. No. 6,031,142 A, CA 617788 A, JP 2002-003639 A, JP 2002-003639 A, D. W. van Krevelen "Properties of Polymers" at Elsevier 1990 p. 200-203, pub., J. Brandrup and E. H. Immergut "Polymer Handbook" 2nd edition p. IV-337 to IV359, pub., B. Carlowitz and G. W. Becker and D. Braun "Die Kunststoffe" Hanser-Verlag Munich 1990, p. 842 ff, especially Table 5.39 on p. 843.

The object of the present invention is to specify equipment, facilities and methods which can efficiently extract further moisture, in particular solvents and/or water, from a concentrated target polymer solution.

This object is achieved with the features of the independent claims.

An extruder has a housing, a first material inlet for a mixture at least consisting of solvent and dissolved medium, a material outlet, a screw with screw drive, at least one distillation region between the inlet and the outlet, which allows an outflow of solvent and/or water from the mixture, and a discharge line for the exiting solvent.

A facility for producing the target polymer product has at least one falling-film evaporator and/or a thin-film evaporator and an extruder connected thereto with a distillation region for discharging solvent and/or water between the inlet and outlet of the extruder.

In a method for separating a solvent from a solution, the solution is fed into an extruder having at least one distillation region where solvent emerges from the surface of the solution and is discharged.

A possible application of the invention is a method for producing a solid, preferably granular, crumbly or powdery target polymer product from a target polymer solution, comprising the following steps: a) producing the target polymer solution by dissolving the target polymer in a solvent or dissolving out the target polymer with a solvent from a composite material and separating the target polymer solution from the insoluble components, b) concentrating the target polymer solution, which has a temperature above 100° C. or at least the boiling temperature of water, preferably by bringing the target polymer solution into contact with steam at a temperature of at least the boiling temperature of water, thereby expelling a solvent-steam mixture, and further concentrating with the extruder described until the target polymer product is obtained in the form of a tough deformable solid strand, the temperature of the target polymer solution remaining below the boiling temperature of the target polymer solution when the solvent-steam mixture is expelled.

If further mechanical processing of the target polymer product is required after the extruder outlet, for example to obtain granular or crumbly or powdery material, this can be achieved in equipment downstream of the extruder, such as a mill or similar facility parts.

The present invention also relates to the additive-containing or additive-free target polymer products which are obtainable by the above or subsequently described method and/or with the described extruder and the entire facility.

The target polymer product may be in the form of a masterbatch, which can serve as a carrier for pigments and which comprises in particular a polyolefin, in particular a polyethylene, as the target polymer containing at least 40% by weight, advantageously at least 50% by weight and even better at least 60% by weight of carbon black. The carbon black can be a carbon black as an additive for colour pigmentation or as a special carbon black for obtaining electrical conductivity in plastics.

The target polymer product may also be a compound comprising, in particular, a polyolefin, in particular a polypropylene, as the target polymer containing reinforcing filler of talc and/or fibres with particularly long fibre lengths, where the fibre lengths may be greater than 1 mm, typically 1 to 1.5 mm, very particularly 2 mm or greater than 3 mm.

The present invention additionally relates to a method in which a solvent-containing polymer, in particular polyolefin, very particularly polyethylene, with or without the addition of an additive, if necessary with the aid of the described extruder, is dried only to such an extent that a target polymer product with a residual solvent content in the range of 1 to 7% by weight, preferably 3 to 5% by weight, is present.

The polymer products, particularly polyolefins, very particularly polyethylenes or polypropylenes, may contain 1 to 7% by weight, preferably 3 to 5% by weight of solvents.

The target polymer products, in particular polyolefins such as polyethylenes and polypropylenes, may contain carbon black(s) and/or talc and/or reinforcing fillers with particularly long fibres over 1 mm and may contain 1 to 7% by weight and preferably 3 to 5% by weight of solvents, which improves the material properties of the mixture during dispersion and granulation.

A target polymer is understood to be any polymer which can be converted by the method according to the invention or by means of the described extruder or the entire facility into a solid and possibly granular and/or powdery solid target polymer product, possibly mixed with additives.

The method can be used to separate composites and/or to incorporate additives into a polymer. In step a), a target polymer solution is first produced. The target polymer solution can be produced by dissolving a single-variety target polymer to be processed by a recycling process. The target polymer can also be a component of a composite material to be recycled. In this case, the target polymer is selectively dissolved out of the composite material by the solvent, while the other components of the composite material form a solid residue, which is separated, for example, by filtering or centrifuging.

In a further step b) or in further facility parts, the solvent is then expelled from the solution, including distillation of the solvent from the solution. In a rather late method step the mentioned extruder is used.

The method according to the invention allows polymer waste to be efficiently recycled and at the same time target polymer products to be obtained. These can be production waste and consumption waste. The production waste originates from original moulding processes, such as polymer processing to produce mouldings, semi-finished products, fibres or films by injection moulding, extrusion, calendering, rotational moulding, foaming, blow moulding or similar processes. In step a), the polymer waste produced by these production processes is dissolved in a suitable organic solvent. To improve the dissolving process, the layer structure of the film material can be destroyed by pregranulation before dissolving. Pre-granulation ensures that all polymer layers of the multilayer film come into contact with the solvent.

The method can be performed with non-polar or polar target polymers. Examples of non-polar target polymers are polyolefins such as polyethylene (PE) and polypropylene (PP). The polyethylene can be a high-density polyethylene (HDPE), a low-density polyethylene (LDPE), a linear low-density polyethylene (LLDPE), a high molecular weight polyethylene (PE-HMW) or an ultra-high molecular weight polyethylene (PE-UHMW). Examples of polar target polymers are polyvinyl chloride (PVC), polyvinylidene chloride (PVDC), polystyrenes (PS), modified polystyrenes, styrene copolymers, polyacrylates, polymethacrylates, polyesters such as polyethylene terephthalate (PET) or polybutylene terephthalate (PBT), polyamides and polycarbonates. This list is not restrictive or exhaustive. The method according to the invention can be carried out with any polymer that can be converted into a solution by dissolving it in an organic solvent.

The method is preferably used as a method for the recycling of pure polyolefins or of polyolefins contained in a composite material and at the same time as a production method for polymer products. In this context, polymer products are primarily understood as polymers with additives which have intentionally and deliberately changed properties compared to the polymers as new material.

A first example of such a composite material is a multilayer film comprising at least one layer of polyethylene as the target polymer and at least one layer of polyamide. In this case, the polyethylene can be dissolved out of the composite material with the aid of a non-polar solvent, for example at a temperature of about 100° C., leaving the polyamide as a solid. Further examples of multilayer films are PP/PA multilayer films, such as filter mats, PP/PET multilayer films, and PP/PE multilayer films. An example of composite material that is not a multi-layer film is PVB-glass composite, as in car windows, PE/aluminium or PVC/aluminium, as in medicine packaging.

The target polymer can already be dissolved in the solvent at room temperature. For faster dissolution, however, it is advantageous to prepare the target polymer solution by heating, stirring and pumping, in which case the temperature should remain below the boiling temperature of the solvent. In addition, larger amounts of polymer can be dissolved at higher temperatures, so that highly saturated or supersaturated target polymer solutions are obtained and at the same time less solvent is required. For example, the dissolution method can be carried out at 50 to 150° C., for example at 100° C., although higher and lower temperatures are also possible depending on the type of polymer and the type of solvent, especially depending on the boiling temperature of the solvent as a typical upper temperature limit for dissolving the target polymer.

The solubility of the target polymers in a solvent also depends on the polar or non-polar character of the solvent and target polymer. Polar solvents preferably dissolve polar polymers; non-polar solvents preferably dissolve non-polar polymers. For good solubility, the solubility parameter of the target polymer must be similar to the solubility parameter of the solvent. For the definition of the solubility parameter we refer to the following literature: "Properties of Polymers", D. W. van Krevelen, 1990, p. 200-202, "Polymer Handbook", J. Brandrup and E. H. Immergut, pub., $2^{nd}$ edition p. IV-337 to IV-359. Suitable solvents can also be taken from the Plastics Handbook (Kunststoff-Handbuch, Vol. 1 Die Kunststoffe, pub. G. W. Becker, D. Braun; Munich, Vienna, Hanser, 1990, p. 842 ff, especially Table 5.39 on p. 843). On the basis of his general technical knowledge and/or simple tests and the above literature, which is incorporated by reference in the present application, a person skilled in the art is able to select the appropriate solvent or solvents for each polymer.

In order to selectively extract the target polymer from a composite material, the other components of the composite material should be insoluble or only very slightly soluble in the solvent. However, the other components may be soluble in the solvent or contained in the target polymer solution if they can be easily removed in a further method step or if they can remain in the solid target polymer without adverse effects. An example of components which may remain in the target polymer are residues of colour pigments or dyes if the method according to the invention is used to produce a masterbatch containing carbon black in which the carbon black covers the inherent colour of the target polymer. An example of the selective dissolution of a polymer from a composite material is the above-mentioned extraction of polyethylene with a non-polar solvent from a PE-PA multilayer film, in which the polyamide remains as an insoluble solid. It is a particular advantage of the method according to the invention that components from the starting polymer, such as colour pigments or dyes, can remain in the target polymer product in whole, in part or in low concentration if the target polymer product is coloured by a newly introduced additive to such an extent that a colouration caused by residues is sufficiently covered. In this way, a time-consuming cleaning step to completely remove originally contained components can be avoided.

Suitable solvents are organic aromatic or non-aromatic solvents, with non-aromatic solvents being preferred due to their lower toxicity.

For polar polymers, halogen-free polar solvents such as alcohols, ketones, ethers and esters are preferred. The use of methanol, ethanol, propanol, isopropanol, acetone, methyl ethyl ketone, tetrahydrofuran and methyl acetate is particularly advantageous.

According to the invention, fatty acid esters and fatty acid ester mixtures, fractions from petroleum distillation, in particular gasoline fractions or diesel fuels, aliphatic hydrocarbons, alicyclic hydrocarbons, aromatic hydrocarbons, individually or in a mixture, can be used for dissolving non-polar target polymers, in particular the polyolefins preferably used, such as polyethylenes or polypropylenes. Biodiesel with a boiling range of 300 to 570° C. and rapeseed oil can be used as fatty acid ester mixtures. The petroleum fractions that can be used include heating oil and diesel fuel with a boiling range of 170 to 390° C. Gasoline fractions that are suitable as solvents for non-polar polymers are the test fuels of type 1 (boiling range 130-185° C.), type 2 (boiling range 140-200° C.), type 3 (150-190° C.), type 4 (boiling range 180-220° C.) and type 5 (boiling range 130-220° C.), which are also used as a substitute for turpentine, "white spirit" or mineral spirits, the special boiling point gasolines of type 2 (boiling range 80-110° C.) and type 3 (boiling range 100-140° C.), cleaner's solvent (boiling range 80-110° C.), aliphatine (boiling range 100-160° C.), ligroin (Sdp. 150-180° C.) and kerosene (boiling range 180-270° C.). N-alkanes, for example C8-C17 alkane fractions, as well as isoalkanes, such as C10-C25 fractions and isoparaffins, can be used as aliphatic hydrocarbons. Alicyclic hydrocarbons, such as cycloalkanes, for example cycloheptane, and aromatic hydrocarbons, such as toluene or xylenes, are also suitable as solvents for non-polar target polymers. The solvent may contain the above substances individually or as a mixture of two or more of the above substances. The solvent may also have additives added in a planned manner, which may be up to 2 or 5 or 10 or 20% by weight.

The method according to the invention is carried out in step b) with a target polymer solution which has a temperature of at least the boiling temperature or above the boiling temperature of water. In addition, the target polymer solution should preferably remain liquid and not boil when the hot steam is introduced. Solvents with a relatively high boiling temperature are therefore preferred. The solvents used in accordance with the invention or its components therefore have a boiling temperature at atmospheric pressure above 100° C., preferably above 110° C., for example in the range from 140 to 180° C. Although solvents with a higher boiling point are preferred, the problem arises with particularly high-boiling solvents that the solvent can only be expelled with difficulty or only with particularly hot steam. An upper limit for the boiling temperature is therefore 570° C., as can be found with biodiesel, although better still below 300° C. because of the easier evaporation, preferably below 250° C., or even below 220° C. For such high-boiling solvents, the rate at which the solvent evaporates can be controlled by the temperature of the hot steam and the temperature of the target polymer solution, taking care that the solvent preferably does not boil in the equipment used. Solvents such as hexane or cyclohexane which boil below 100° C. are less suitable because they evaporate too quickly in contact with hot steam, which would result in sticky and tough target polymer masses, which are unsuitable for further processing within the equipment, and not the solid, possibly granular, powdery material intended.

The high-boiling solvents listed above have particularly good dissolving properties for the target polymers, especially polyolefins. By working at high temperatures, particularly large quantities of target polymers can be brought into solution. However, the good dissolving properties and the low vapour pressure of the solvent basically bring with it the problem of effectively removing the solvent from the dissolved target polymer up to a defined residual content. One of the most important advantages of the method according to the invention is that the high-boiling solvents, despite their low vapour pressure, can be removed again from the target polymer up to a desired residual content as an additive with the aid of a suitably hot steam at a suitably high method temperature of the solvent, but the solvent/target polymer solution remains in liquid form until the end, before the target polymer product changes into a solid and finally possibly granular or powdery form. This avoids the problems that arise when using low-boiling and therefore explosively evaporating solvents such as acetone, hexane or methyl ethyl ketone.

The solvent or its components may or may not be miscible with water. According to the invention, it is preferred that the solvent is not miscible with water, since in this case, after the mixture of steam and solvent has been expelled and condensed, a two-phase liquid is obtained which can be easily separated into water and solvent. Water and solvent can thus easily be returned to the method as separate phases.

The target polymer solution prepared in step a) of the method according to the invention has a quantity ratio of target polymer to solvent preferably in the range of 1:5 to 1:20 parts by weight, even more preferably in the range of 1:6 to 1:15 parts by weight and preferably in the range of 1:7 to 1:10 parts by weight.

The target polymer solution, which may be prepared or present at room temperature, can be heated to a temperature of more than 100° C. or at elevated pressure of at least the boiling temperature of water, advantageously for step b). In step b), the target polymer solution thus heated is brought into contact with steam at a temperature at least equal to the boiling temperature of water. At this temperature, the target polymer solution is typically low-viscosity before the start of evaporation of the solvent in step b), which is advantageous for its flowability in devices and at the same time facilitates the penetration of the steam into the target polymer solution. The hot steam with a temperature of at least 100° C. or with a temperature of at least the boiling point of water at elevated pressure ensures the evaporation of the solvent, whereby the speed at which the solvent is expelled together with steam can be influenced by the level of the steam temperature.

The steam can be generated in a steam boiler facility. The superheater can be used to further heat the steam above its evaporation temperature, resulting in overheated steam or superheated steam. Between the triple point at 0° C. and the critical point at approx. 375° C., water is either a steam or a liquid depending on pressure, so that a suitable pressure-temperature combination must be selected to obtain steam. By increasing the pressure, the boiling temperature of the water and thus the steam temperature can be increased. At a pressure of 6 bar water boils at 156° C., at a pressure of 10 bar water boils at approx. 180° C., so that steam temperatures of 180° C. or even higher can be generated without any problems by operating a superheater at a correspondingly high pressure and letting the steam escape from the superheater under expansion and pressure drop. The pressure required for a given steam temperature is given by the pressure-temperature graph ((p, T) graph) of water, which is attached as FIG. 1. According to the graph, it is also possible to produce hot steam in the apparatus at an overpressure above atmospheric pressure. FIG. 1 also shows the dependence of the boiling point of water on the prevailing pressure. The temperature specifications in this description refer to ambient pressure. If other pressures prevail, correspondingly shifted values may apply.

The expulsion of the solvent in a mixture with steam according to step b) of the method according to the invention can be further accelerated by additionally heating the target polymer solution by an external heating device in contact with the target polymer solution. In this case, the target polymer solution is heated by both the hot steam and the external heating device, which can lead to an acceleration of the evaporation of the solvent below its boiling point, especially in the case of very high-boiling solvents. The external heating device can raise the temperature of the target polymer solution even further than with steam. Conversely, the external heater allows less hot steam to be used to heat the target polymer solution to the same temperature. Under the method conditions, the temperature in the evaporator(s) is above the boiling temperature of water at the pressure in the equipment. This prevents condensation of the water in the equipment, which is therefore always gaseous. An exception is water, which in a dynamic equilibrium increasingly penetrates the target polymer solution and is incorporated into the target polymer.

It is preferred that the temperature of the hot steam is at least 100° C. or above 100° C. and at most at the boiling point of the target polymer solution. If the temperature of the steam is within this range, the solvent is expelled without boiling as a vapour mixture with steam and at the same time water is added to the solution.

As far as, for example, a temperature of 100° C. in connection with water is mentioned above in this description, the boiling point of water at atmospheric pressure can be assumed. Accordingly, values other than 100° C. are present if the method takes place at a pressure other than atmospheric pressure. The values result from the characteristic curve of the boiling point above pressure. Depending on the substance, temperatures other than those specified for the other materials may also be present, which can also be derived from the respective characteristic curves.

The temperature of the hot steam is preferably about 10 to about 100° C. below the boiling point of the solvent or the target polymer solution. The rate at which the solvent evaporates can be controlled by this temperature difference between the boiling temperature of the target polymer solution and the steam temperature. The closer the steam temperature is to the boiling temperature of the solvent, the faster the solvent evaporates. The expert can easily select the type and the desired boiling temperature of the solvent, the temperature of the target polymer solution when the steam is introduced and the temperature of the hot steam in such a way that a solid, possibly granular or powdery target polymer product with a defined residual solvent content is obtained from the target polymer solution in the desired method time at the desired evaporation rate of the solvent.

To bring the target polymer solution and hot steam into contact, the hot steam can be introduced into the target polymer solution and, if necessary, additionally directed onto the target polymer solution to flow over the surface of the target polymer solution. If the target polymer solution is in a container or pipeline, the hot steam is preferably introduced directly into the target polymer solution or injected under elevated pressure. The steam then has atmospheric pressure or a slight overpressure of, for example, 2 bar in the target polymer solution.

The introduction of the hot steam and the evaporation of the solvent/steam mixture is preferably carried out in one or more falling-film evaporators and/or in one or more thin-film evaporators. Falling-film evaporators are particularly suitable for concentrating the target polymer solution, with the target polymer still being present as a solution after concentration. Due to their design, thin-film evaporators can be used for further concentration of the target polymer solution, in which case the target polymer can be obtained as a viscous or granular or powdery product after concentration. It is therefore particularly preferred to use one or more falling-film evaporators and then one or more thin-film evaporators or exclusively a number of thin-film evaporators for carrying out step b) of the method according to the invention.

In accordance with the invention, so much solvent is expelled in the falling-film evaporator(s) that the quantity ratio of target polymer to solvent is in the range from 1:0.5 to 1:4 parts by weight, and so much solvent is expelled in the thin-film evaporator(s) that the target polymer solution contains 7 to 20% by weight of solvent, based on the total weight of target polymer and solvent.

For steam injection, an assembly of one or more suitably mounted nozzles can be used. Upstream of the nozzle(s) there may be strong overpressure and water may be (only just) liquid. Downstream, expansion to the pressure in the solution container or tube or evaporator (atmospheric pressure or above) is achieved, and the conditions are such that water is introduced or applied as steam in any case. If the target polymer solution is present as a thin flowing liquid film, such as in a large-scale facility in a falling-film evaporator, the hot steam can additionally be directed in co-current or counter-current flow onto the thin film or flow over the liquid film.

The hot steam has several functions in the method according to the invention: —a first function is to heat the target polymer solution, whereby a mixture of solvent and steam is expelled and the target polymer solution is concentrated. This heating function can be advantageously supplemented by heating the target polymer solution with an external heating device; —a second function is to maintain the target polymer solution in the liquid state up to a high degree of saturation without producing target polymer contained therein as a solid, which facilitates processing; —a third function of steam is to vigorously stir the target polymer solution when it is introduced or injected into the target polymer solution. This stirring function at least partially replaces the use of stirring devices in an industrial facility; —a fourth function of steam introduced or injected into the target polymer solution, which is, according to the invention, quite essential, is to drastically increase the surface area from which the solvent of the target polymer solution can evaporate into the gas phase. The evaporation surface in evaporators usually consists of the surfaces which the evaporator itself, like a falling-film evaporator, provides for the formation of a liquid film. The introduction or injection of hot steam into the target polymer solution leads to the formation of a large number of fine steam bubbles in the target polymer solution, the surfaces of which form a very large additional evaporation surface into which the solvent can evaporate. The applicants have found that this additional internal surface area can drastically increase the evaporation rate compared to evaporation without introduced steam. Comparative tests have shown that at the same temperature, the evaporation rate can be increased by a factor of 5 to 10, in particular by a factor of 7 to 8, if steam is introduced into the target polymer solution and the steam forms bubbles in the target polymer solution into which the solvent can evaporate. According to the invention, this effect is of particular importance because the preferred solvents have a high boiling point and show only a low tendency to evaporate, but at the same time, due to their good dissolving properties, form a particularly close bond with the target polymer molecules; in this situation, the solvent usually adheres firmly to the target polymer; with the hot steam it is nevertheless possible, due to the increase in surface area, to effectively remove the high-boiling solvents from the target polymer solution and the target polymer without appreciable amounts of the solvent adhering to the powdery end product; —a fifth function of the hot steam with a temperature above 100° C., which is quite essential according to the invention, is to promote the formation of a granular or powdery target polymer and to prevent the formation of sticky or tough or glassy agglomerates of target polymer. The penetration of the water into the target polymer solution is also effectively supported by the above effect of increasing the surface area by means of steam bubbles. The target polymer product formed after carrying out the method according to the invention with a defined residual solvent content as an additive is granular or powdery, has excellent rheological properties, is dry to the touch and not sticky and is therefore an ideal starting material for the manufacture of new target polymer products from target polymer product obtained in this way. With the help of the steam, the powdered target polymer product is given a structure which, as will be explained below, is ideal for the incorporation of additives and other applications.

In step b) of the method, the solvent is first gradually expelled as a solvent/steam mixture with the aid of hot steam. Then, the described extruder is used to further extract solvent and residual moisture/water. From an initially low-viscosity target polymer solution, a concentrated target polymer solution is produced, which becomes increasingly viscous at the prevailing temperature, but without losing its flowability. Finally, and lastly in the extruder, the increasingly viscous target polymer solution is concentrated to such an extent that the target polymer at the high method temperatures in step b) is produced without cooling as a plastically deformable strand at the extruder outlet, which still contains certain amounts of solvent and water. The target polymer product thus obtained preferably contains 7 to 13% by weight of solvent, based on the total weight of target polymer and solvent. Even more preferably, the solvent content is 9 to 11% by weight. The water content is typically 2 to 8% by weight and is one of the reasons for the excellent properties of the resulting target polymer product. While under the prevailing temperature conditions, polymers usually accumulate as a tough solid mass during concentration; a product is obtained under the action of steam.

The invention furthermore relates to the target polymer products obtainable by the above method.

The target polymer products owe their properties very much to the action of steam on the target polymer solution at a temperature above 100° C., so that the water used is always gaseous in the form of steam, but the temperature is chosen low enough to keep the target polymer solution liquid without boiling. Apart from the mixing and evaporation-promoting effect of steam bubbles, it is assumed that water molecules are directly incorporated into the target polymer liquid. Under the prevailing temperature conditions, a dynamic equilibrium may be established in which water molecules which are incorporated into the target polymer solution are desorbed again. In this dynamic equilibrium of absorption and desorption, the water molecules at least partially displace the organic solvent from the compound of the target polymer molecules. Initially, the macromolecules, which are stretched in the heat, are kept separated from each other by organic solvent. Without being bound to a theory, water molecules could replace solvent molecules as the solvent evaporates, thus preventing agglomeration into a viscous liquid. Even with higher target polymer concentrations, the fluid initially remains fluid and then becomes increasingly viscous with a consistency reminiscent of hot honey. Finally, at high temperatures above 100° C., a granular or powdery target polymer product is formed. Preliminary tests with a polyethylene solution without the introduction of steam have shown that simple evaporation of the solvent produces a tough, partially sticky mass which traps solvents and is unusable for further technical use. The powdery or granular consistency of the obtained target polymer product can thus be directly attributed to the effect of the steam on the target polymer solution, and thus the granular or powdery structure of the resulting solid.

According to a preferred embodiment of the method according to the invention, the granular or powdery target polymer product obtained in step b), which still contains 7 to 20% by weight of solvent and 2 to 8% by weight of water, can be dried in a further step c) under heating without the addition of hot steam to form a target polymer product with a further reduced solvent content and a significantly reduced water content. For this purpose, the target polymer from step b) is dried after processing in the extruder, for example in a mill or with the aid of heating screws, preferably in a vacuum, after which the solvent content of the target polymer product is 1 to 7% by weight, advantageously 3 to 5% by weight. The product with this residual solvent content is, as shown below, ideally suited for subsequent granulation or other applications.

The target polymer product from step b) can be granulated after leaving the extruder and can be further easily ground into a powder before being dried in step c). Drying is carried out at elevated temperature, the temperature being chosen so that the solvent escapes from the target polymer at a sufficient rate, but at the same time the granular or powdery polymer particles do not soften and stick or fuse together. The target polymer product obtained in step c) exhibits surprising melting and flow properties.

As an example, a polyethylene product obtained by the method according to the invention is disclosed. While a powdered polyethylene which contains no solvent has a melt flow index (MFI) of about 5, the solvent content of 1 to 7% by weight and preferably 3 to 5% by weight according to the invention causes the MFI value of the polyethylene product to rise to about 10 during melting. The MFI value thus increased corresponds to a higher fluidity of the polymer melt, which allows better processing in an extruder and, as shown below, better distribution of additives in the molten target polymer. The MFI measurement is carried out according to the standardised procedure using the molten polyethylene produced according to the invention at 190° C., which flows through a defined bore under a pressure of 2.16 kg.

Other advantageous applications for the polymer product with increased melt flow index are: —the possibility of further compounding efficiently; —use as a polymer base product for compounders; —use as a material for 3D printing.

The target polymer particles produced in step b) of the method according to the invention are believed to have an open and porous structure and have an increased melt flow index and surface area compared to the particles of the prior art. For these reasons, a surprisingly large amount of additives can be incorporated into the target polymer products obtained in step b).

Therefore, a further preferred embodiment of the method according to the invention is the addition of an additive or a mixture of additives during the course of step b). The additive or the mixture of additives can be added in solid form, but in particular in liquid form, as a suspension or as a solution, the solvent or the liquid for the preparation of the suspension preferably being the same liquid as that used for dissolving the target polymer.

According to this preferred embodiment, the additive or mixture of additives is added, the additive or mixture of additives being added to the target polymer solution as soon as the quantity ratio of target polymer to solvent has risen to a value in the range of 1:0.5 to 1:4 parts by weight due to the evaporation of solvent, or being mixed into the target polymer solution before this is introduced into the first thin-film evaporator. However, depending on the quantity and material properties, an additive can also be added via the extruder.

After step b) an additive-containing granular or powdery target polymer product can be obtained; after step c) a dried additive-containing powdery or granular target polymer product can be obtained. The additive content may be more than 50% by weight, based on the total weight of target polymer, additive and residual solvent.

The excellent rheological and haptic properties of the granular or powdery target polymer products and their ability to absorb large amounts of additives, which enables the production of masterbatches (compounds) with a high additive content, are essential features of the method and target polymer products according to the invention. It is assumed that the high absorption capacity for additives is caused by a strongly loosened microscopic structure of the granular or powdery target polymer particles as a result of a greatly increased specific surface area as a result of the continuous action of steam when the solvent is expelled and the high melt flow index as a result of a defined residual solvent content.

In accordance with another preferred embodiment, a further additive or mixture of additives is added after step b) and before step c) or after step c). The addition of different additives at different points in time of the method according to the invention enables the targeted introduction of different additive combinations into the gradually solidifying target polymer product. For example, a carbon black can be added during the performance of step b), and after step b) and before step c) a reinforcing filler consisting of fibres with a long fibre length can be added.

According to the invention, the additives may be solid additives advantageously selected from carbon blacks, organic pigments, inorganic pigments, dyes, reinforcing inorganic or organic fillers such as talc, glass fibres, carbon fibres, glass balls, metallic particles and mixtures thereof. According to the invention, the target polymer product provided with additives can be in the form of a powdery or granular material or can be processed into granules in a further step.

The additive which can be incorporated into the target polymer product according to the invention is preferably a carbon black which can be added to the target polymer solution which has a quantity ratio of target polymer to solvent in the range of 1:0.5 to 1:4 parts by weight. The proportion of carbon black in the carbon black-containing target polymer is more than 50% by weight, preferably 60% by weight and more than 60% by weight, based on the total weight of target polymer, additive and remaining solvent. According to the method according to the invention, preferably 51 to 70% by weight of carbon black or also more than 70% by weight of carbon black can be introduced into the masterbatch of a polymer, in particular polyethylene. As the target polymer product according to the invention, the masterbatch can be present as a powdery material as mentioned above or can be processed into granules in a further step.

In addition, a type of carbon black can be used as an additive to produce an electrically conductive plastic, for example PEel, conductive polyethylene. Due to their fine powderiness, these types of carbon black can only be worked into plastics as additives with high concentrations in conventional methods.

With the additive introduced according to the invention, fibre reinforcements with a fibre length of approx. 1.5 to 6 mm can still be advantageous. The open and loose structure and the high melt flow index of the target polymer products according to the invention allow a particularly gentle addition of the fibres, which makes it possible to incorporate fillers with particularly long fibres. Prior-art polymer pellets can usually be used to incorporate fibres with a maximum length of up to 1.5 mm. With the method according to the invention and the resulting products according to the invention, it is possible to incorporate fibres with a fibre length of more than 1.5 mm and up to at least 6 mm. The present invention therefore also relates to a target polymer product which can be reinforced with fibres with a length of 1.5 to at least 6 mm.

The method can be carried out with polar target polymers as well as with non-polar target polymers, since above all the essential function of steam to form gas bubbles in the target polymer solution is independent of the physical and chemical properties of the individual target polymer. The recycling of polyolefins, such as polyethylenes and polypropylenes, according to the method according to the invention is particularly preferred in order to produce corresponding target polyolefin products. For dissolving the non-polar polyolefins, according to the invention, all solvents can be used which are specified above for dissolving non-polar polymers.

The inventors have found that the recycling of polyethylenes is particularly preferred under the temperature conditions mentioned in the embodiment, and that for the recycling of polypropylenes the solution/method temperature should be about 20 to 30° C. higher than for polyethylene. The method is preferably carried out with hot steam, which can be wet steam, superheated steam or saturated steam, with superheated steam being preferred. According to the invention, the steam at atmospheric pressure can have a temperature in the range of 100 to 250° C., preferably 120 to 200° C., particularly preferably in the range of 140 to 180° C. At other pressure conditions, correspondingly different temperatures may be present. The temperature of the steam can be at or just above the boiling temperature of the solvent, which may also cause the solvent to boil. It is therefore preferably at a temperature below the boiling temperature of the solvent, about 5 or 10 or 20 or 50° C. below. In this case, the difference between the actual temperature of the steam and the boiling temperature of the solvent can be used to influence the rate at which the solvent is expelled and the target polymer is converted into a solid. The closer the temperature of the hot steam is to the boiling temperature of the solvent, the more efficiently the target polymer solution can be converted into the solid target polymer product. By adjusting this temperature difference between the boiling temperature of the solvent and the steam temperature, the evaporation rate can also be adapted to the design of an evaporation device.

The invention furthermore relates to a facility for carrying out the method. An embodiment of this facility is shown schematically in FIG. 2.

It may include several or all of the following units:
a steam boiler facility with superheater for the production of hot steam and superheated steam;
one or more heatable process containers 1, 2, in which the target polymer solution is prepared; the dissolution of the target polymer can, for example, be divided between two process containers 1, 2, wherein in the first process container 1 a first target polymer solution is obtained and in the second process container 2 the insoluble components from the first process container 1 are brought into contact with fresh solvent; the process containers 1, 2 are heated, for example, with steam from the steam boiler facility; the mixture of target polymer and solvent is permanently pumped around in the container 1, 2 in order to accelerate the dissolving method via the friction which arises at the same time; by means of the pumping around, dissolution of the target polymer can be achieved without the installation of a mechanical stirrer;

a solvent storage container 3 with heating device 4, from which the heated solvent is conveyed into the process containers 1, 2;

one or more coaxial heat exchangers that heat the solvent to the desired temperature range;

a screw conveyor 5 for filling the process containers 1, 2 with pure target polymer or with a composite material containing the target polymer in combination with insoluble components;

a pump for pumping out the insoluble components of a composite material from the process containers 1, 2, which remain after the selective dissolution of the target polymer;

one or more devices for processing the insoluble components, such as centrifuges, screw conveyors for removing the centrifuged insoluble components, vacuum dryers, solids dryers, as well as a filling device, if the insoluble component is a pure polymer which is to be packaged and marketed after drying;

a collection container 6, in which the target polymer solution separated from the solid is collected before it is further processed in the first falling-film evaporator 7;

one or more heatable falling-film evaporators 7, 8, in which the target polymer solution is brought into contact with hot steam and the solvent is continuously expelled by the hot steam, whereby a highly viscous target polymer solution is obtained; the hot steam is preferably introduced into the feed tube 9, through which the target polymer solution is fed, or directly into the head region 10 of the falling-film evaporators 7, 8; in the region of the closed head 10 or distributor head of the falling-film evaporator 7, 8 the pressure is about 2 bar, and in the sump outlet 11, 12 it is 1.2 bar to 1 bar; overall, evaporation in the falling-film evaporator 7, 8 preferably takes place at a slight overpressure; the target polymer solution is further heated by the steam and enriched with steam bubbles, into which the solvent evaporates; the formation of the gas bubbles increases the evaporation surface in the falling-film evaporators many times over;

the introduction or injection of the hot steam into the head region 10 or the supply line 9 of the falling-film evaporators 7, 8 still fulfils the function of a stirring device;

a heating device 13, 14 for heating the falling-film evaporators 7, 8 into which hot steam from the steam boiler facility can be introduced;

a unit for the supply of hot steam in the sump outlet of the falling-film evaporator(s) 7, 8 through which additional hot steam can be directed in counterflow onto the target polymer liquid film in the tubes of the falling-film evaporator;

one or more thin-film evaporators 15 into which the highly viscous liquid from the falling-film evaporators 7, 8 is passed, in which hot steam is passed into the product stream in the head region 10 in order to expel a solvent-steam mixture and to obtain the target polymer as a granular or powdery material at the high temperature prevailing in the thin-film evaporator 15; in the thin-film evaporator 15, the principle is also applied in the still liquid product stream to form a large quantity of fine vapour bubbles by introducing steam, into which the solvent can evaporate; in the thin-film evaporator 15, the solvent, which may be present, is evaporated; the thin-film evaporator 15 applies the mixture to the wall via its scrapers; the product flow is preferably in three parts: in the upper part the wall is heated, the mixture remaining liquid; two further heating stages heat the material until the material is discharged in granular or powder form. This method takes place at a negative pressure of 0.5-0.9 bar. At the end of the thin-film evaporator 15, a granular material is obtained with 10-20% solvent, 2-8% water and, if necessary, with a specified carbon black content.

a heating device for heating the thin-film evaporators 15, into which hot steam from the steam boiler facility can be introduced;

an extruder 30 with a distillation region for discharging escaping solvent and/or water;

one or more heatable drying devices, such as a drying screw (not shown), in which the solid granular or powdery target polymer emerging from the extruder is further dried (step c) with heating, but without the addition of steam, until a granular or powdery dried target polymer is obtained;

a unit 17 for the preparation of one or more additives, in which the additives, in particular carbon black, are dissolved or suspended preferably in the same solvent or suspending agent as the target polymer solvent and preferably at the same temperature;

storage container 18 for the thin-film evaporator 15, in which the target polymer solution and the solution or suspension of the additive(s) are mixed, after which the resulting mixture is fed into the thin-film evaporator 15;

separators at the outlet of falling-film evaporators 7, 8 and the thin-film evaporators 15 for separating the target polymer solution from the solvent-steam mixture;

devices for condensing the solvent/steam mixture;

a container for separating water and solvent;

a control device provided to control the individual components of the facility as necessary. It may comprise one or more control components, in particular one or more networked or independent digital components, in particular programmable computers. It may also have analogue electrical and, where appropriate, mechanical components. It has sensors for recording process and method parameters connected to the control components, and actuators for influencing them (open-loop control, closed-loop control) according to the results of the control components. One or more memories may be provided to store method data and/or program data and/or control parameter data. One or more operator interfaces may be provided for method control and influencing and for data and program maintenance. The interfaces may be designed for operators or for communication with other or higher-level automatic components. Electrical or digital control components can be located locally directly at the facility components and/or remotely from them and connected via lines or networks (LAN, WLAN, Bluetooth, Internet, . . . ) with local digital components and/or sensors and/or actuators.

The vapour water and the water-solvent vapour to be condensed can be discharged from the above devices and containers. The condensate of water and solvent forms two separate phases when water and solvent are not miscible. If the solvent is lighter than water, it is separated as the supernatant of the two-phase system. Both phases can be recycled back into the process. Some or all of the containers and pipes may be sealed and pressurised, preferably at overpressure. On the other hand, the essential method steps can also take place at atmospheric pressure. The system may be closed and filled with inert gas.

The method is preferably carried out continuously.

The method may provide for the solvent to be expelled with hot steam from a target polymer solution in a falling-film evaporator, wherein the steam is both introduced into the target polymer solution at the top of the falling-film evaporator and is directed onto the liquid film in counter-current to the flowing liquid in the bottom outlet of the falling-film evaporator. A resulting solvent-containing polymer product, in particular polyolefin, especially polyethylene, with or without added additives, is dried to such an extent that its residual solvent content is in the range of 1 to 7% by weight, preferably 3 to 5% by weight. It has been found that for a virgin polymer product containing no solvent, the melt index MFI is about 5, whereas for a polymer product with the solvent content indicated above, an MFI value of about 10 is obtained. The higher MFI value corresponds to a higher fluidity of the polymer melt, which results in better processability in an extruder and other advantages for the applications listed above.

Lastly, the invention relates to the use of 1 to 7% by weight of solvent, preferably 3 to 5% by weight of solvent, in an additive-free or additive-containing polymer product to improve the melt flow index compared to the pure polymer.

Below, aspects and embodiments of the invention are described with reference to the drawings, in which.

Figure 1:
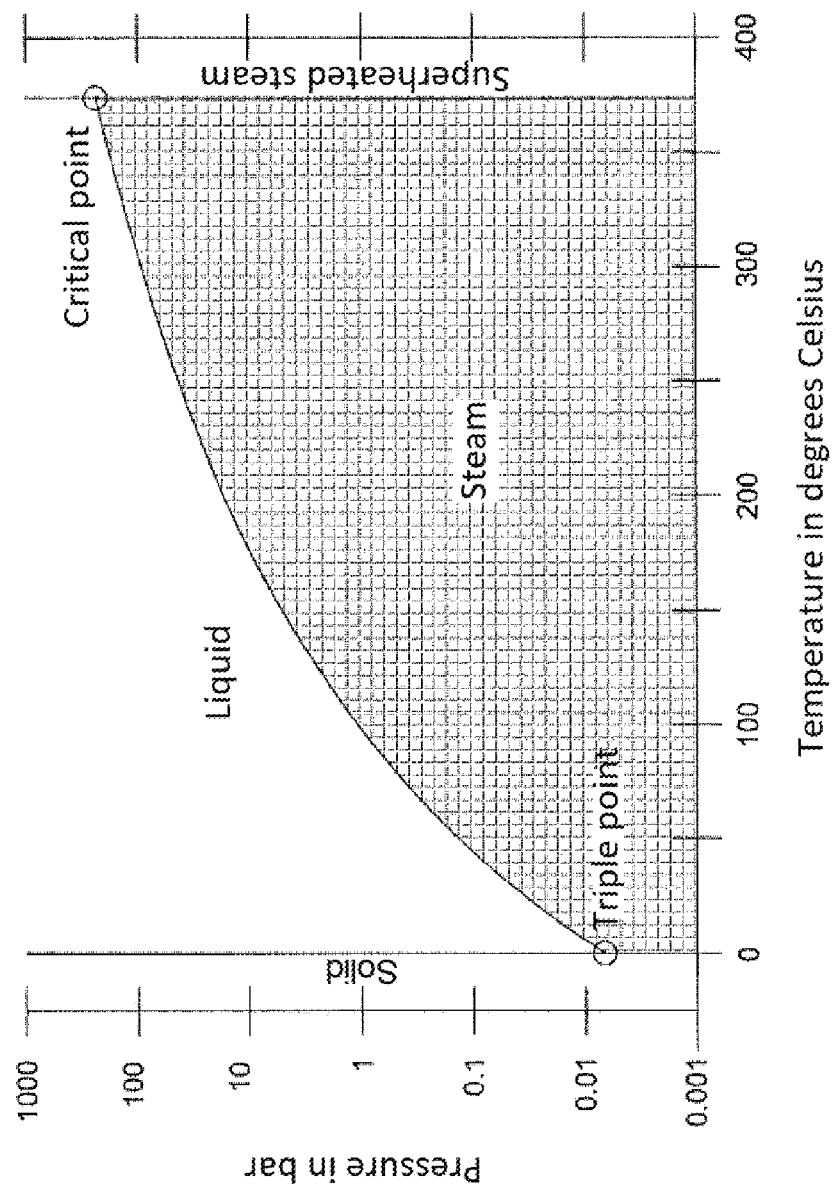
FIG. 1 shows the pressure-temperature graph of water.
Figure 2:
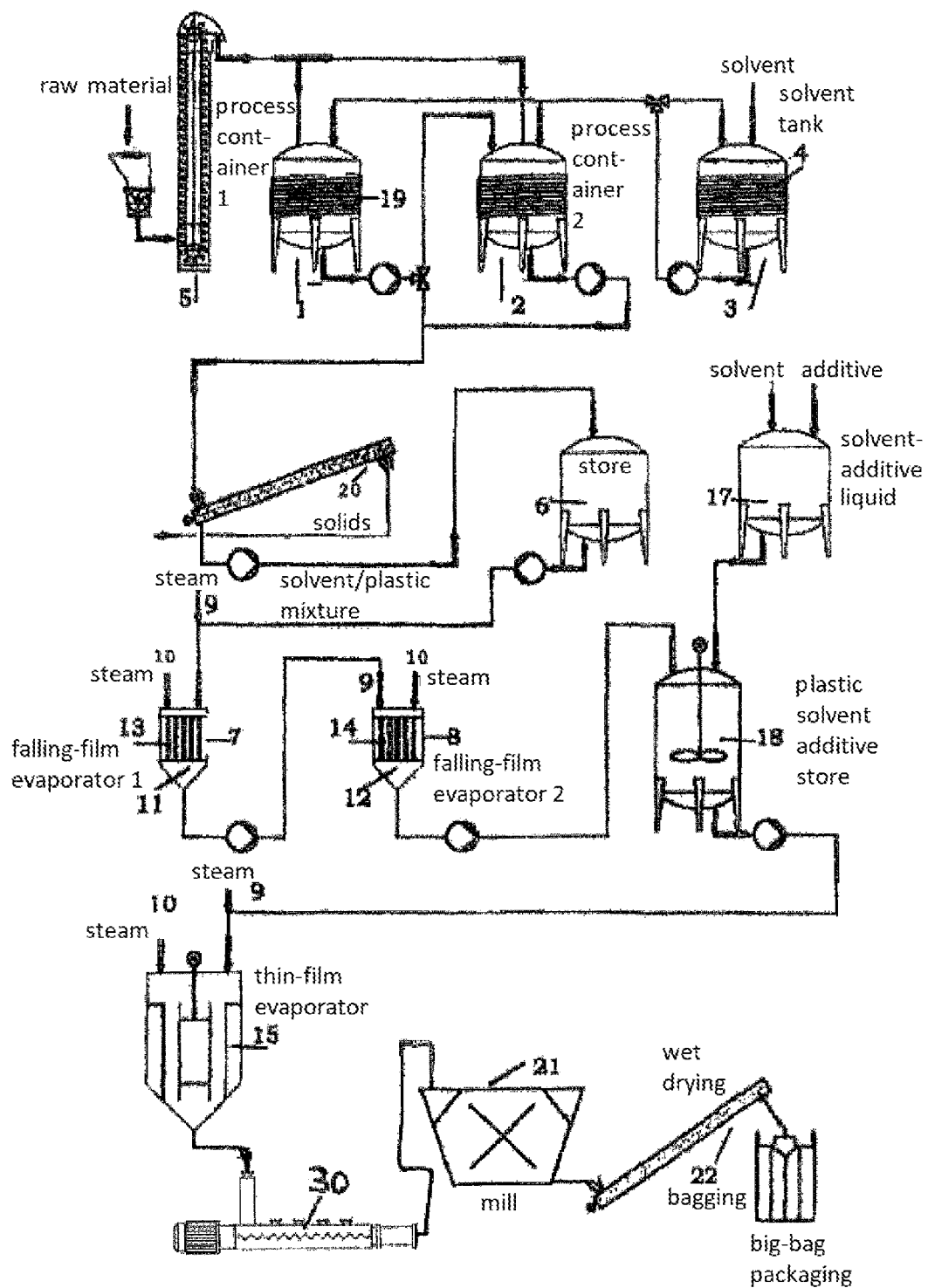
FIG. 2 shows the overall facility.
Figure 3:
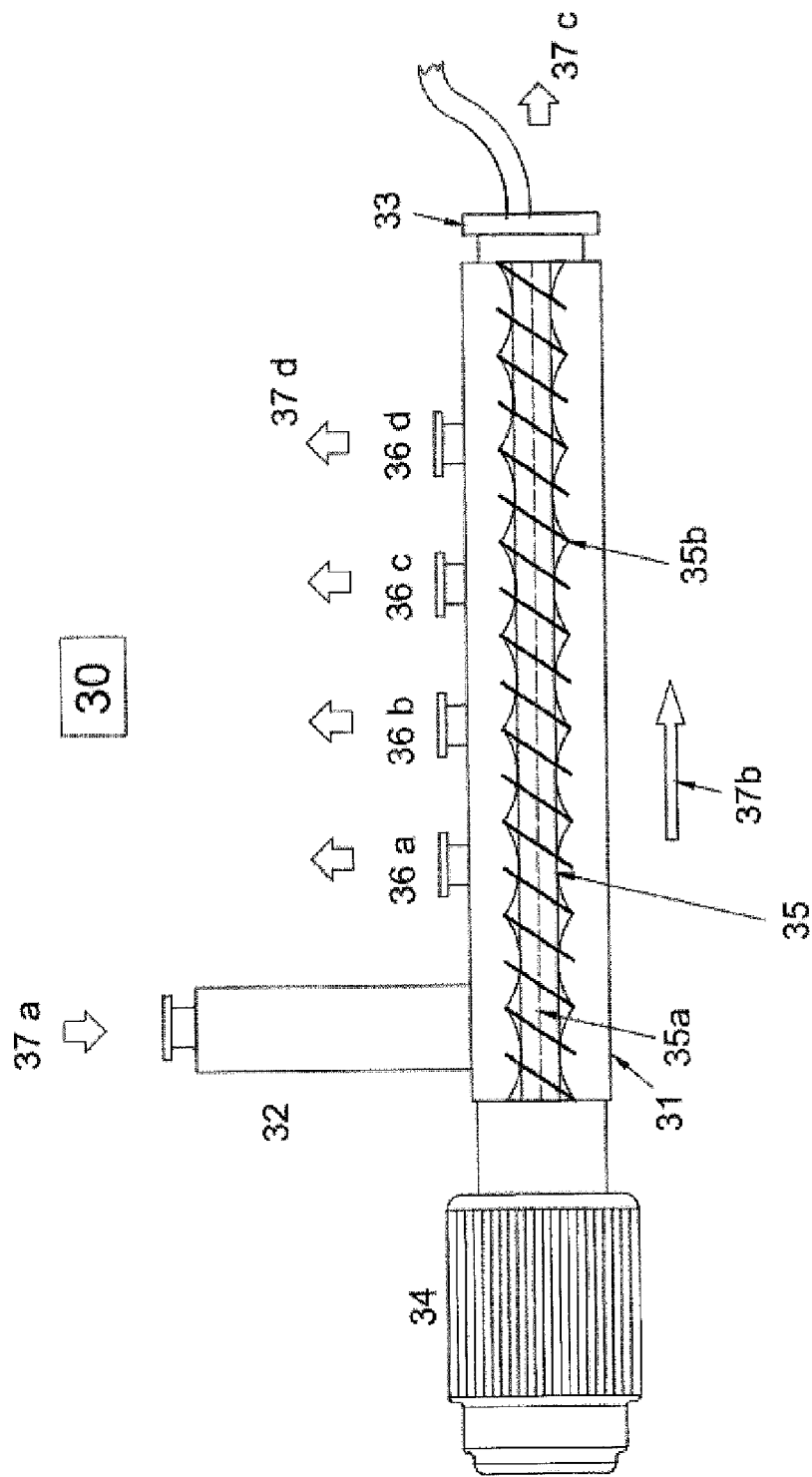
FIG. 3 shows schematically an extruder.

FIG. 3 shows an extruder 30, as it is schematically drawn in FIG. 2 in the lower left corner of the overall facility. The different arrows 37*a*, 37*b*, 37*c* and 37*d* symbolise material flow directions, namely 37*a* the direction of the incoming material, 37*b* the main material flow within the extruder, 37*c* the outgoing material and 37*d* distilled solvent or water.

The extruder 30 has an extruder body 31 with a material inlet 32 at the upstream end of the body 31 and a material outlet 33 at the downstream end. 35 symbolises a screw rotating in the body 31 with a screw core 35*a* and a screw helix 35*b*. The enveloping surface of the outer dimension of the rotating screw with a screw core 35*b* may be, viewed in the radial direction, at least in some areas positively interlocked with the inner circumferential surface of the surrounding recess in the body 31 or may be slightly reduced in relation to it, for example by max. 2 mm or max. 1 mm or max. 0.5 mm in the radial direction. 34 is a drive for the screw, which sets the screw in rotation in such a way that the material flow is effected along the arrow 37*b*. It should be noted that the core 35*a* can have a constant or non-constant diameter over its length, and that the pitch can be constant or variable over the length of the screw.

36*a* to 36*d* denote a plurality of (specifically: four) distillation ranges. Quite generally, at least one of them is provided, but two, three, four, five, six or even more distillation regions may also be provided along the material flow according to arrow 37*b* and, viewed in the direction of transport 37*b*, may lie one behind the other and may be separated from each other.

At the material inlet 32, the extruder 30 receives the mixture of target polymer, solvent and, as applicable, other substances to be treated, including water from previous method steps. In one version, the facility control or design is such that viscous material (such as honey) is fed in at the inlet 32. Expressed in numbers, it may have a content of 10% to 50% solvent (and possibly water) at the inlet, based on the total weight including additives or without additives, the percentage being based on weight. Preferably values between 15% and 35% are used, more preferably values between 20% and 25% at the material inlet. It should be noted here that residual moisture can be between 0.1% and 5% at the outlet, preferably 0.2% to 2%, more preferably 0.5% to 1%. Here too, the percentages are based on weight and relate to the proportion of solvent and, as applicable, water in relation to the total weight with or without additives.

The design of the screw 35 can be such that the screw is self-pulling at the inlet 32, or the material can be forced in at the inlet 32. The driven screw 35 causes the material to be transported in the extruder body 31 along the arrow 37*b*, to the right in the drawing of FIG. 3. In this way it passes the distillation region 36*a* to 36*d*. One of these regions, 36*a*, is shown schematically in FIG. 4.

In the distillation regions 36, moisture (i.e. solvent and/or water) can escape from the mixture, so that the mixture is transported further along the arrow 37*b* with reduced moisture. In this way, a reduction of the residual moisture takes place in each of the distillation regions 36, so that their relative content decreases and the material accordingly becomes increasingly viscous to solid-like with plastic deformability. Finally, a plastically deformable polymer material with a very low residual moisture content or a residual moisture content of a desired value or within a desired value range can be applied at the extruder outlet, for example to support further processing in other machines or equipment.

The material can then finally be extruded at the outlet 33, for example as an initially continuous strand of the material with the desired cross-sectional shape. However, further fragmentation can also take place right here at the outlet, so that pellets or short pieces of material are produced. The extruder can have a single opening at the outlet or a number of parallel openings from which parallel strands of material are extruded.

The inlet of the extruder 30 can receive material from a thin-film evaporator 15 or from a falling-film evaporator 13, 14. The outlet of the extruder 30 can be connected to other equipment, such as a drying screw (not shown) for further drying of the extruded material, or a mill 21 or similar.

Figure 4:
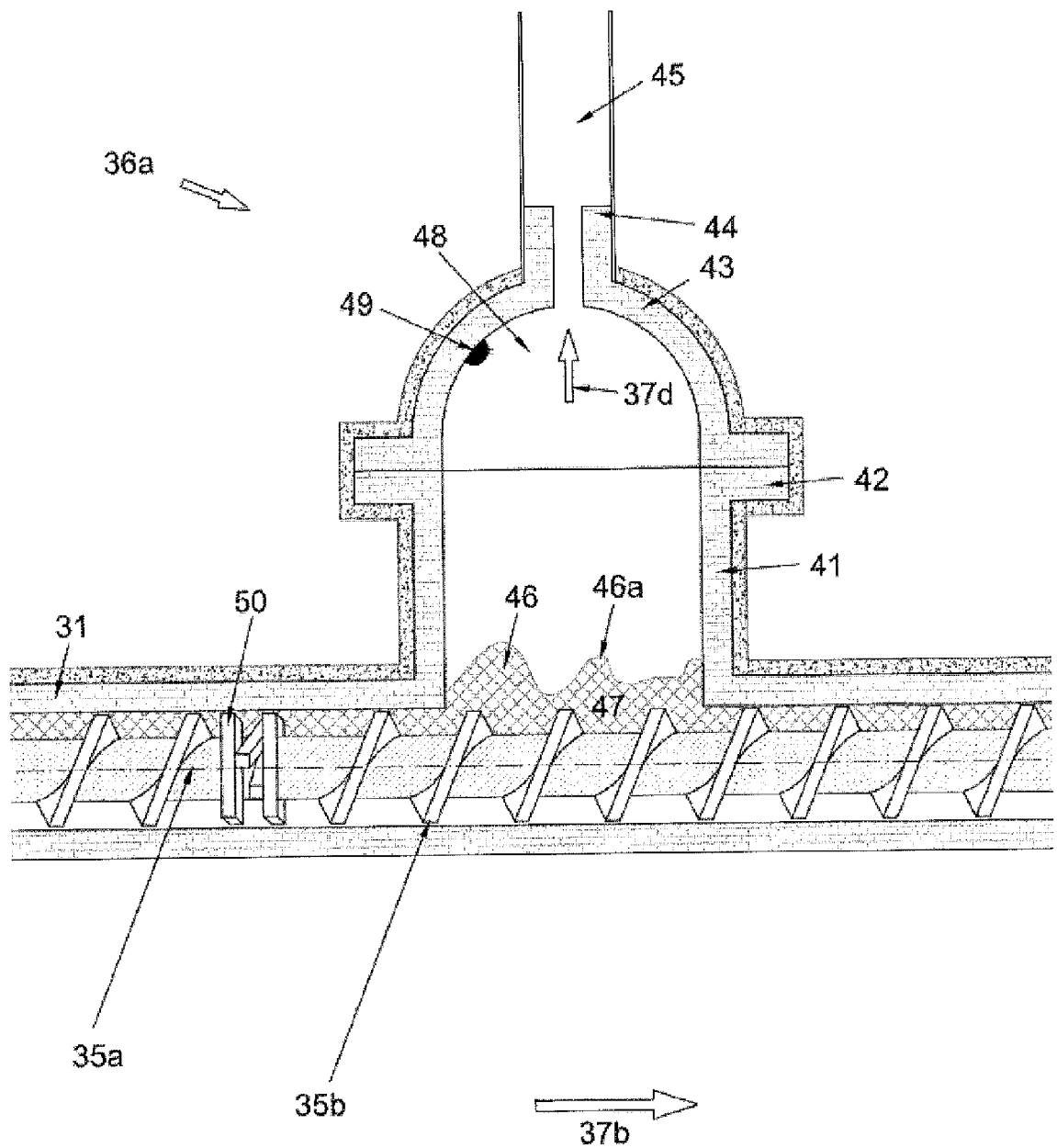
FIG. 4 shows schematically a distillation region of an extruder.

FIG. 4 schematically shows a distillation region 36*a*. It has an opening 47 in the wall 31 of the extruder body. Preferably, the opening 47 is at the top (with respect to the direction of gravity), so that material does not flow away. An attachment 41 is provided, which leads away from the housing wall 31 radially in relation to the screw rotation and which can be provided with a distal flange 42.

Generally speaking, the extruder 30 is a closed system without direct access from outside or to the outside. The distillation regions 36 can also be closed regions. For example, an overarching dome or coupling 43 can be attached to the attachment 41 or flange 42, and in turn has a connection piece 44 to which a line 45 can be attached. The dome 43 is used to collect and guide the escaping material (solvent and, as applicable, water, in vapour form or already liquid), and the connection piece 44 and line 45 are used to discharge it.

Preferably, water and/or solvents are discharged from the material in gaseous/vapour form and are then drained off via the connection piece 44 and line 45. This can be done passively by moving the steam along the arrow 37*d* via the connection piece 44 to the line 45 according to the pressure conditions. Or it can be actively sucked/extracted.

46 symbolises the material present and transported in the extruder. 46a is the surface of the material in the distillation region 36a. It can be seen that the volume 48 defined in the distillation region is not completely occupied by the material 46. Rather, there is free volume that is intended to increase the exposed surface 46a of the material 46 so that the corresponding residual moisture can evaporate from the material 46 similarly to a distillation. A fill level sensor (not shown) may be provided in a distillation region. The system parameters can be subject to open-loop or closed-loop control in such a way that the complete filling of the free volume of the distillation region 36 is avoided or that a set fill level is not exceeded.

The evaporation or distillation effect can be increased by using a heater 49, only indicated schematically, which heats the material 46 in the distillation region 36 or upstream of it. The heater can work electrically or by means of radiation (microwaves) or via a heat exchanger.

To ensure that the material is mixed as homogeneously as possible, kneading devices 50 can also be provided to mix the material 46 by kneading. A kneading device 50 may be provided outside a distillation region 36, for example upstream thereof, and/or within a distillation region 36.

The screw core is symbolised with 35a, and the screw helix with 35b. Their design can be such that at the downstream end of a distillation region 36a the screw is self-pulling and therefore reliably discharges material 46 from the distillation region 36, thus ensuring that the volume 48 in the distillation region 36 is not filled with material 46. The desired transport properties of the screw can be achieved by variable design of the core diameter and/or the outer diameter and/or the pitch of the screw.

The line 45 can be a rigid pipeline or a hose. For example, it can lead to a condenser in which the discharged vapours are condensed to liquid. However, the line 45 can also lead directly to a store for raw material to be dissolved, so that the raw material is dissolved by solvent vapours right there.

The extruder, in essence, does not operate at negative pressure or only slightly drops below the atmospheric pressure (not below 500 hPa). Insofar as the vapours escaping in the distillation region 36 are extracted, slight negative pressures (not below 500 hPa) may occur. The extruder places the material under overpressure (compared to atmospheric pressure) in some areas, at least at the outlet, to extrude the remaining material.

Quite generally, it may be intended that an additive is added in the extruder and mixed with the other material. A separate (not shown) additional inlet can be provided for this purpose, or the additive can be added via the already mentioned inlet 32, just like the main material. The materials are then mixed by means of the screw 35 and, if necessary, the kneading device 50, so that the additive is intimately and homogeneously mixed and blended with the other material at the outlet 33 of the extruder.

The extruder may have an open-loop or closed-loop control system (not shown). It can be connected on the input side to a sensor system on the extruder or elsewhere in the process and/or on the output side to an actuator system on the extruder. The sensor system can comprise one or more temperature sensors, possibly distributed over the length of the extruder or over the plurality of distillation regions, and/or one or more residual moisture sensors, possibly also distributed over the length of the extruder or over the plurality of distillation regions, and/or one or more fill level sensors approximately at one distillation region 36, possibly also distributed over the length of the extruder or over the plurality of distillation regions. The actuator can be the heater 49 and/or the kneading device 50 and/or the extruder drive 34 and/or a material feed (not shown). Elements of the actuator system can be actuated according to signals from the sensor system. For example, the heating and/or the drive speed can be adjusted according to the residual moisture measured at the extruder output, and/or the material feed can be operated according to a measured fill level. The control system can be provided separately for the extruder or can be part of the overall facility control system.

The method shown is an extruder used to extrude a solution received on the inlet side towards the outlet and to remove residual moisture from solvent and, as applicable, water in distillation regions. As already mentioned, the material can be heated or kneaded. It is possible to bypass a number of distillation regions. The method comprises feeding in input material of said input composition in terms of water, solvent and target polymer and, as applicable, filler, and operating the extruder so as to produce material with the desired output composition. A filler/additive may be added. In the same way, however, the material fed to the extruder may have additives added earlier (for example, added in the falling-film evaporator or in the thin-film evaporator). Depending on the residual moisture measured at the extruder outlet, heating and/or the drive speed can be adjusted, and/or depending on a measured fill level, the material feed (quantity per time) can be operated or adjusted.

It may be preferable for the extruder to process material without fillers/additives, i.e.—apart from impurities—a mixture only of solvent and dissolved medium and, as applicable, water. However, the extruder can also receive material already provided with fillers/additives and/or mix in fillers/additives itself. It may then be desirable to have, finally, mixtures with not too large amounts of fillers/additives, for example with a proportion of the total weight above 0.1% or above 1% but below 20% or below 10%.

In the following, an embodiment for the industrial application of the extruder is described.

EMBODIMENT

Production of a Masterbatch from Polyethylene and Carbon Black

The method comprises a first stage in which a polyethylene product is obtained using the method according to the invention from a multilayer film having a polyamide layer and a polyethylene layer, and a second stage in which carbon black can be added to the polyethylene product.

A) Production of Preferably Powdery Polyethylene Product with 3-5% Solvent Content The PA-PE multilayer film is destroyed by granulation to make the polyethylene more accessible for the dissolving process. As comparative tests have shown, the granules are dissolved much more easily than snippets from the PA-PE multilayer film. The PA-PE granules are then conveyed by a screw conveyor 5 into the process container 1 in FIG. 2, which is kept at a temperature of 100° C.-120° C. by hot steam 19. White spirit type 4 is heated to 120° C. in the solvent storage container 4 and then pumped into the process container 1, where it dissolves the polyethylene from the granules at a temperature of 100-120° C. The temperature is maintained at 100-120° C. by hot steam. The contents of the process container 1 are constantly pumped around. The resulting movement replaces the stirrer and accelerates the dissolving process. After 15 min a solution is obtained which contains 90% of the polyethylene in dissolved form. The polyethylene solution is prepared using 1 part by weight of polyethylene and 8 parts by weight of white spirit. The polyamide insoluble in the white spirit settles quickly with undissolved polyethylene at the bottom of the process container 1. The polyethylene solution forms the supernatant and is pumped into a collection container. In the continuous method, the dissolving process is repeated every 30 min with a new batch of the processed PA-PE multilayer film.

The suspension of polyamide particles, undissolved polyethylene and polyethylene solution arising at the bottom of the process container 1 is pumped into another process container 2, in which undissolved polyethylene is dissolved out with fresh white spirit at 100-120° C. The container contents are also pumped around here. The ratio of solids to solvent is 1 to 3. The polyethylene solution is combined with the main solution in the collection container.

The suspension of polyamide particles in white spirit is pumped onto a dewatering screw 20 and again rinsed with white spirit at 100-120° C., resulting in a material consisting of 98% polyamide with a residual polyethylene content. The suspension is centrifuged, the separated polyamide is rinsed with steam at a temperature of 150° C., then removed from the centrifuge and placed in a heated screw conveyor. The heating of the screw conveyor serves to evaporate the solvent, which is intensified by a hot air stream. After leaving the screw conveyor, the polyamide is fed into a vacuum dryer, in which a white spirit adhering to the polyamide for the last time is removed with 150° C. hot steam and then the polyamide is predried in a vacuum at 130° C. After further drying in a solids dryer, the granular polyamide can be filled into bags for further recycling.

The condensates, which are produced in the various method steps, are conveyed to a sedimentation container. In the sedimentation container, the solvent with a density of 0.7 g/cm3 accumulates as an upper layer. An intermediate layer consists of entrained polymer particles with a density of 0.9 g/cm3, which is separated. The lower layer consists of water with a density of 1.0 g/cm3. All three phases are returned to the production method.

The polyethylene solution freed from the polyamide in the collection container 6 is kept at a temperature of 90° C. by hot water in an external heater. The polyethylene solution is fed through an inlet pipe 9 into the head region 10 of a falling-film evaporator 7, which comprises 96 pipes which are kept at a temperature of 140° C. by means of hot steam flowing through pipes 13 at an overpressure of 0.9 bar. The head region 10 is filled with the target polymer solution to ensure uniform filling of the 96 tubes. In the head region 10, high-pressure steam at a temperature of 160° C. is introduced into the stream of polyethylene solution through one or more nozzles, which also reduce the pressure, preferably with the stream, if necessary additionally in counter-current. The hot steam heats the polyethylene solution and, when introduced, leads to the formation of steam bubbles and bubbles in the target polymer solution, into which the solvent evaporates. The steam can be introduced mixed with another gas (for example inert gas, nitrogen). The introduction mechanism can be designed to optimise bubble formation, for example by using a large number of nozzles (n>5 or >10 or >20) of relatively small cross-section immersed in the solution. The orientation of the nozzles (i.e. the fluid flow out of them) can be parallel. However, at least in part, they may also be arranged in pairs, not parallel or crossing each other. Vapour injection can, for example, take place in a solution supply line for the solvent/PE solution of an evaporator, approximately shortly upstream of the end of the supply line.

The heated polyethylene solution mixed with the steam and enriched with steam and possibly gas bubbles reaches the 96 tubes of the falling-film evaporator 7, and flows as a thin film on the heated surface of the tubes 13 in the direction of the sump outlet 11 of the falling-film evaporator 7. Under these conditions, a mixture of white spirit vapours and steam is expelled and water molecules are incorporated into the polyethylene structure. The temperature, caused by the external heating and the hot steam, and the properties of solvent and polymer are such that the solvent quantity is halved up to the sump outlet 11 of the falling-film evaporator 7. The vapour is separated from the liquid by a separator and is fed to the condensation and recovery of water and solvent. The quantity ratio of polyethylene to white spirit is then 1:4.

The concentrated heated polyethylene solution is fed into a second falling-film evaporator 7, the design of which is identical to the design of the first falling-film evaporator 7. Here, too, the hot steam is introduced into the head region 10 of the falling-film evaporator 8 at a temperature of 140-160° C., which leads to further heating of the target polymer solution and to the accumulation of glass bubbles in the target polymer solution, which increase the evaporation surface. The steam bubbles become enriched with solvent. At the lower end of the second falling-film evaporator 8, the weight ratio of polyethylene to white spirit is 1:1. The vapour is separated from the liquid by a separator and fed to the condensation and recovery of water and solvent. The solution is clearly more viscous, similar to hot honey. When this highly viscous solution is cooled, a waxy solid is obtained which is easily crumbled mechanically.

B) Production of the Carbon Black Masterbatch

A concentrated slurry of carbon black in white spirit is prepared in an additive container 17. The carbon black can be a type of carbon black for colouring and/or a type of carbon black for obtaining electrical conductivity in polyethylene. Carbon black and white spirit are mixed. The temperature is adjusted to 160-180° C. with hot steam. The polyethylene solution from the second falling-film evaporator 8, with a ratio of 1:1 (target polymer:white spirit) and the carbon black suspension from the additive container 17 are combined and mixed in a mixing device 18 with the addition of hot steam. The viscous polyethylene solution enriched with carbon black is then added to a thin-film evaporator 15. Hot steam at a temperature of 140-160° C. is passed into or over the product stream. The thin-film evaporator 15 itself is heated with hot steam of 140° C. at a slight pressure of 0.9 bar, which flows through a pipe system in the thin-film evaporator 15. In the thin-film evaporator 15, a mixture of steam and test gasoline vapor continues to be expelled until the liquid content of the target polymer is only 10-20% by weight. Under these conditions the polyethylene containing carbon black is present as black crumbly polyethylene with a carbon black content of 60 wt. %.

Then, the mixture is fed into the described extruder 30 and further processed as described. From the extruder 30, the masterbatch of polyethylene and incorporated carbon black is transported to a mill 21. In the mill 21 the masterbatch is crushed and discharged via a screw 22. In a drying screw the masterbatch is dried at 100° C. to a residual moisture content of solvent and, as applicable, water of 3-5%.

The masterbatch with a residual solvent moisture of 3-5% is then fed to the final granulation process. The residual moisture increases the melt flow index of the masterbatch in the screw from 5 to 10, which facilitates the incorporation of the carbon black into the polyethylene with optimum distribution of the carbon black and improves granule formation.

A carbon black masterbatch in granular form with a carbon black content of 60% by weight is obtained. Alternatively, the masterbatch as the target polymer product cannot be dried in granular form but in powder form, which may have advantages when used as a masterbatch.

In the above description, features should be considered to be combinable with each other even if this is not expressly stated, unless their combination is technically impossible or unfeasible. Descriptions of methods and method steps are also to be understood as descriptions of devices for implementing the particular method or method step, and vice versa.

Combinations of features C1 ff, which may be related to the extruder, the described facility and the method, can be described as follows:

C1. A method for producing a solid target polymer product from a target polymer solution, comprising the steps of: a) producing the target polymer solution by dissolving the target polymer in a solvent or dissolving out the target polymer with a solvent from a composite material or a mixture and separating the target polymer solution from the insoluble components, b) concentrating the target polymer solution, which has a temperature of at least the boiling temperature of water, by contacting the target polymer solution with steam at a temperature of at least the boiling temperature of water preferably in at least one falling-film evaporator and/or at least one thin-film evaporator, and then extruding in a described extruder, whereby a solvent-steam mixture is expelled, until the target polymer product has the form of a deformable solid, the temperature of the target polymer solution remaining below the boiling temperature of the target polymer solution when the solvent-steam mixture is expelled.

C2. The method according to C1, characterised in that the solid obtained in step b) is dried in a further step c) by heating without contacting with steam.

C3. The method according to C1 or C2, characterised in that the quantity ratio of target polymer to solvent in the method steps is, independently of one another, in the following ranges: —before step b) in the range from 1:5 to 1:20 parts by weight; —after step b) and before step c) in the range from 7 to 16% by weight of solvent with an additional water content of 2 to 8% by weight; —and after step c) in the range from 1 to 7% by weight of solvent.

C4. The method according to one of the preceding C, characterised in that step b) is carried out in one or more falling-film evaporators (7, 8) and/or one or more thin-film evaporators (15).

C5. Method according to C4, characterised in that in the falling-film evaporator(s) (7, 8) so much solvent is expelled that the quantity ratio of target polymer to solvent is in the range from 1:0.5 to 1:4 parts by weight, and in that in the thin-film evaporator(s) (15) so much solvent is expelled that the target polymer solution contains 7 to 16% by weight of solvent, based on the total weight of target polymer and solvent.

C6. The method according to one of the preceding C, characterised in that, when carrying out step b), an additive or a mixture of additives is added, the additive or the mixture of additives—being added to the target polymer solution as soon as the quantity ratio of target polymer to solvent has risen to a value in the range from 1:0.5 to 1:4 parts by weight as a result of the evaporation of solvent or—being mixed into the target polymer solution before it is introduced into the first thin-film evaporator (15).

C7. The method according to one of the preceding C, characterised in that a further additive or mixture of additives is added after step b) and before step c) and/or after step c).

C8. The method according to C6 or C7, characterised in that the additives are solid additives selected from carbon blacks, organic pigments, inorganic pigments, dyes, reinforcing fillers such as talc, glass fibres, carbon fibres, glass balls, metallic particles and mixtures thereof, the additive or mixture of additives being present in solid form, in liquid form, as a suspension or as a solution.

C9. The method according to one of C6 to C8, characterised in that the additive is a carbon black for colouring the target polymers or a carbon black for electrically conductive target polymers, which is added in a proportion of more than 50% by weight, based on the total weight of target polymer, additive and solvent.

C10. The method according to any of the preceding C, characterised in that the target polymer is a polyolefin.

C11. The method according to one of the preceding C, characterised in that the solvent is selected from fatty acid esters, petroleum fractions, gasoline fractions, diesel fuels, aliphatic hydrocarbons, alicyclic hydrocarbons, and aromatic hydrocarbons, individually or in a mixture.

C12. The method according to one of the preceding C, characterised in that the solvent has a boiling temperature above 100° C., preferably above 110° C.

C13. The method according to one of C1 to C11, characterised in that the solvent is selected from biodiesel having a boiling range of about 300 to 570° C., rapeseed oil, fuel oil having a boiling range of 170 to 390° C., diesel fuel having a boiling range of 170 to 390° C., white spirit of type 1 (boiling range 130-185° C.), type 2 (boiling range 140-200° C.), type 3 (boiling range 150-190° C.), type 4 (boiling range 180-220° C.) and type 5 (boiling range 130-220° C.), special boiling point gasoline of type 2 (boiling range 80-110° C.), special boiling point gasoline of type 3 (boiling range 100-140° C.), cleaner's solvent with a boiling range of 80 to 110° C., aliphatine with a boiling range of 100 to 160° C., ligroin with a boiling range of 150 to 180° C., kerosene with a boiling range of 180 to 270° C. C7-C20 n-alkane fractions, C7-C20 isoalkanes, isoparaffins, cycloheptane or as a mixture of two or more of these substances, and may have other additives which are less than 20 or less than 10 or less than 5 or less than 2% by weight.

C14. The method according to one of the preceding C, characterised in that the steam has a temperature in the range of 110 to 250° C.

C15. The method according to one of the preceding C, characterised in that the target polymer solution in step b) is additionally heated by one or more heating devices (13, 14).

C16. The method according to C15, characterised in that the evaporation surfaces of the falling-film evaporators (7, 8) and/or the thin-film evaporators (15) are kept at a temperature of 80 to 200° C.

C17. The method according to one of C4 to C16, characterised in that the hot steam is introduced into the target polymer solution in the feed line (9) to the falling-film evaporator (7, 8) or in the head region (10) of the falling-film evaporator (7, 8) and steam bubbles are formed in the target polymer solution, into which the solvent evaporates, thereby increasing the total evaporation surface area.

C18. The method according to one of the preceding C, characterised in that the pure target polymer, composite material or mixture used as starting material is converted into granules before being dissolved in step a).

C19. The method according to one of the preceding C, characterised in that the solvent has a boiling temperature in the range from 180 to 220° C., the target polymer is dissolved in the solvent at 50 to 150° C., the target polymer solution is mixed with high-pressure steam at a temperature of 140 to 180° C. in the one or more falling-film evaporators and/or the one or more thin-film evaporators, in order to expel a solvent-steam mixture, and the one or more falling-film evaporators and/or the one or more thin-film evaporators are additionally heated externally with steam at a temperature of 120 to 140° C.

C20. An additive-free or additive-containing target polymer product obtainable by the method according to one of C1 to C19.

C21. A target polymer product as a masterbatch comprising a polymer and carbon black, the carbon black content being at least 51% by weight, based on the total weight of the masterbatch, preferably at least 60% by weight.

C22. A target polymer product as a masterbatch or compound material comprising a polymer and a carbon black type as an additive for electrically conductive plastic, wherein the carbon black content is at least 40% by weight based on the total weight of the target polymer product.

C23. A target polymer product as masterbatch comprising a polymer and colour pigments and having a granular or powdery structure C24. A target polymer product as a fibre-reinforced compound material comprising a polymer and, in addition to other additives, fibres which have a length of at least 2 mm.

C25. A polymer product which is additive-free or contains an additive and has a solvent content of 1 to 7% by weight, preferably 3 to 5% by weight, for improving the melt flow index.

C26. A device for carrying out one of the above processes without mechanical stirrers, comprising: —one or more process containers (1, 2) for producing the target polymer solution, in which the solution is circulated by pumping; —one or more falling-film evaporators (7, 8) and/or one or more thin-film evaporators (15) which are connected via tubes to the process container(s) (1, 2) in which the solvent is expelled from the target polymer solution by steam or hot-pressure steam, the steam being introduced into the head region (10) of the evaporator (7, 8) with a temperature of at least the boiling temperature for mixing, in order to form steam bubbles in the target polymer solution which increase the evaporation surface of the evaporator (7, 8), wherein, if necessary, steam with a temperature of at least the boiling temperature is introduced additionally in co-current flow at the head (10) of the evaporator(s) (7, 8) and/or in counter-current in the sump outlet (11, 12) of the evaporator(s) (7, 8).

LIST OF REFERENCE SIGNS

1 Process container
2 Process container
3 Solvent storage container
4 Heating device
5 Screw conveyor
6 Collection container
7, 8 Falling-film evaporators
9 Feed tube
10 Head region
11, 12 Sump outlet
13, 14 Tubes
15 Thin-film evaporator
16 Screw
17 Additive preparation unit
18 Storage container
19 Steam
20 Screw conveyor for transporting away
21 Mill
22 Screw
30 Extruder
31 Housing
32 Material inlet
33 Material outlet
34 Drive
34 Screw
35*a* Screw core
35*b* Screw helix
36*a*-36*d* Distillation regions
37*a* 37*d* Directions of movement
41 Attachment
42 Flange
43 Dome
44 Connection piece
45 Line
46 Material
46*a* Material surface
47 Opening
48 Volume
49 Heating device
50 Kneading device

The invention claimed is:

1. An extruder, comprising a housing, a material inlet for a mixture including solvent and dissolved medium, a material outlet, a screw rotatable in the housing, a screw drive, and two or more distillation regions between the material inlet and the material outlet which allow an outflow of the solvent, wherein:
   each of the two or more distillation regions is equipped with a respective heater;
   the two or more distillation regions are arranged in succession along the screw; and
   the extruder is attached to a discharge line for the solvent.

2. The extruder according to claim 1, wherein one of the two or more distillation regions has a widening in the housing to which the material outlet is attached.

3. The extruder according to claim 2, wherein the screw at a downstream end of the widening has a self-pulling design.

4. The extruder according to claim 2, wherein a volume of the widening is only partially occupied by the mixture that that transported in the extruder during operation, and the material outlet is attached to a portion of the volume of the widening that is not occupied by the transported mixture.

5. The extruder according to claim 1, wherein the material inlet is a first material inlet, and the extruder further comprises a second material inlet for an addition of an aggregate.

6. The extruder according to claim 1, further comprising a kneading device for kneading material in the extruder.

7. The extruder according to claim 5, further comprising a kneading device located between two of the two or more distillation regions.

8. The extruder according to claim 1, wherein the extruder is configured to allow evaporation of the solvent in the two or more distillation regions, and wherein the material outlet includes a vapour outlet.

9. The extruder according to claim 1, wherein the extruder is configured for operation at atmospheric pressure or at a pressure higher than atmospheric pressure.

10. The extruder according to claim 1, further comprising a control system configured so that a mixture of the solvent, water, and the dissolved medium is fed into the material inlet, the fed mixture having a content of at least 10% or 20% of solvent and water (% by weight).

11. The extruder according to claim 1, further comprising a control system configured to control operation of the extruder so that a mixture of the solvent, water, and the dissolved medium at the material outlet of the extruder has a content of at most 2% or 1% of solvent and water (% by weight).

12. The extruder according to claim 1, wherein the respective heater heats a mixture in a respective distillation region or upstream thereof, and the respective heater operates electrically, by heat exchange, and/or by radiation.

13. The extruder according to claim 1,
further comprising an open-loop or closed-loop control system connected to at least one of a sensor system on the extruder or an actuator system on the extruder, the sensor system including at least one of: one or more temperature sensors, one or more residual moisture sensors, or one or more fill level sensors, and the actuator system including at least one of: a heater, a kneading device, an extruder drive, or a material feed and
wherein the control system is configured to actuate elements of the actuator system in accordance with signals from the sensor system.

14. A system for separating a solvent from a solution, the system comprising the extruder of claim 1 and at least one of a falling-film evaporator or a thin-film evaporator connected to the extruder.

15. A method for separating a solvent from a solution, in which the solution is fed into the extrude of claim 1 and in which the solution is guided through an extruder screw past a number of distillation regions, each of said distillation regions equipped with a respective heater, and wherein the solvent emerges from a surface of the solution and is discharged.

16. The method according to claim 15, in which the solution is kneaded in front of a distillation region of the number of distillation regions.

17. The method according to claim 15, in which, before being introduced into the extruder, the solution is concentrated in at least one of a falling-film evaporator or a thin-film evaporator into which steam at a temperature below the boiling temperature of the solvent is received.

18. The extruder according to claim 1, further comprising a control system configured so that a mixture of the solvent, water, and the dissolved medium is fed into the material inlet, the fed mixture having a content of at most 35% or 25% of solvent and water (% by weight).

19. The extruder according to claim 1, further comprising a control system configured so that a mixture of the solvent, water, and the dissolved medium is fed into the material inlet, the fed mixture having a content of at least 10% and at most 35% of solvent and water (% by weight).

20. The extruder according to claim 1, further comprising a control system configured so that a mixture of the solvent, water, and the dissolved medium is fed into the material inlet, the fed mixture having a content of at least 20% and at most 35% of solvent and water (% by weight).

21. The extruder according to claim 1, further comprising a control system configured so that a mixture of the solvent, water, and the dissolved medium is fed into the material inlet, the fed mixture having a content of at least 10% and at most 25% of solvent and water (% by weight).

22. The extruder according to claim 1, further comprising a control system configured so that a mixture of the solvent, water, and the dissolved medium is fed into the material inlet, the fed mixture having a content of at least 20% and at most 25% of solvent and water (% by weight).

23. The extruder according to claim 1, further comprising a control system configured to control an operation of the extruder so that a mixture of the solvent, water, and the dissolved medium at the material outlet of the extruder has a content of at least 0.1% or 0.3% of solvent and water (% by weight).

24. The extruder according to claim 1, further comprising a control system configured to control an operation of the extruder so that a mixture of the solvent, water, and the dissolved medium at the material outlet of the extruder has a content of at most 2% and at least 0.1% of solvent and water (% by weight).

25. The extruder according to claim 1, further comprising a control system configured to control an operation of the extruder so that a mixture of the solvent, water, and the dissolved medium at the material outlet of the extruder has a content of at most 2% and at least 0.3% of solvent and water (% by weight).

26. The extruder according to claim 1, further comprising a control system configured to control an operation of the extruder so that a mixture of the solvent, water, and the dissolved medium at the material outlet of the extruder has a content of at most 1% and at least 0.3% of solvent and water (% by weight).

27. The extruder according to claim 1, wherein the extruder has a control system, and wherein the control system is designed to control the operation so that the mixture of solvent, water and dissolved medium at the material outlet of the extruder has a content of at most 1% and at least 0.1% of solvent and water (% by weight).

28. The extruder according to claim 13, wherein the control system is configured to actuate the elements of the actuator system in accordance with the signals from the sensor system to adjust at least one of heating or drive speed in accordance with a measurement of residual moisture at the material output and/or to operate the material feed in accordance with a measured fill level.

* * * * *